Figure 1:
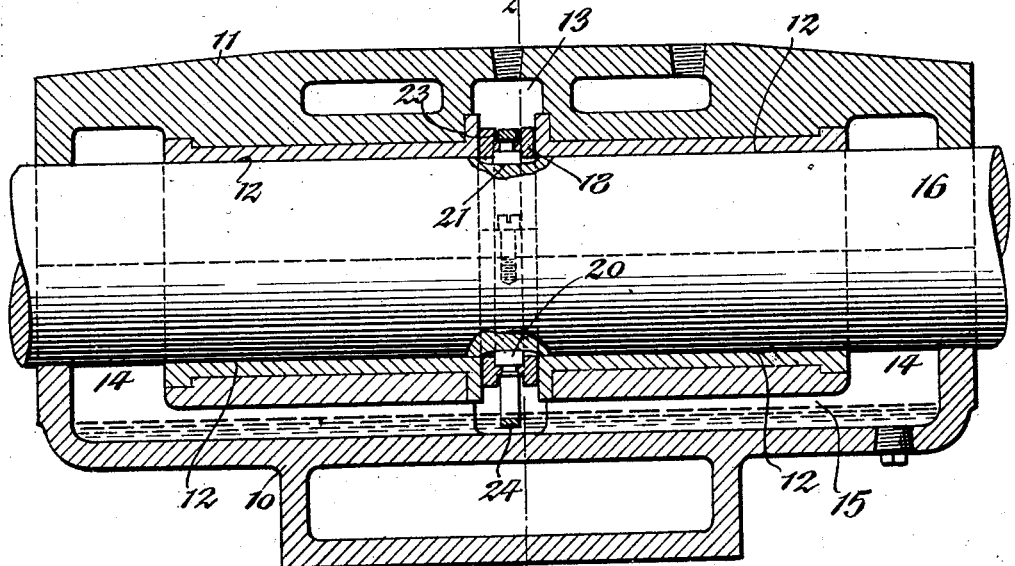

Dec. 20, 1927.

H. J. SMITH ET AL
SELF OILING BEARING
Filed April 4, 1923

1,653,377

2 Sheets-Sheet 1

Dec. 20, 1927.  
H. J. SMITH ET AL  
1,653,377
SELF OILING BEARING
Filed April 4, 1923  2 Sheets-Sheet 2
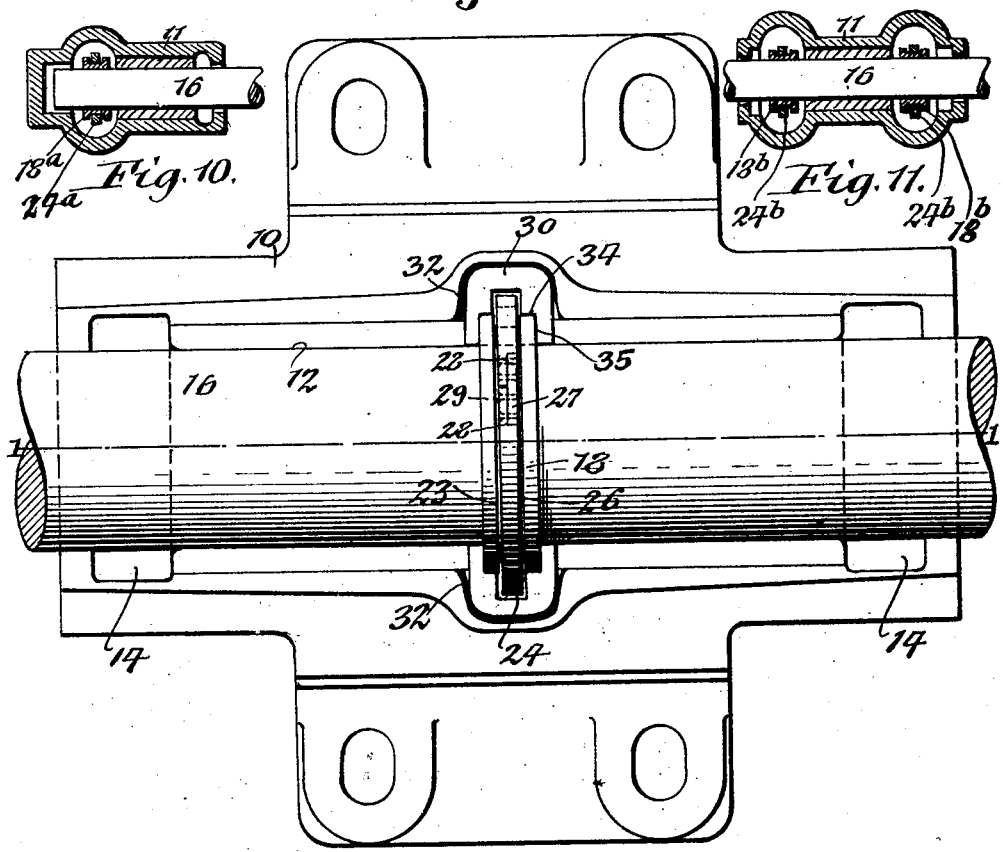

Patented Dec. 20, 1927.

1,653,377

UNITED STATES PATENT OFFICE.

HARRY J. SMITH AND BENJAMIN A. SMITH, OF LAKEWOOD, OHIO, ASSIGNORS TO HILL CLUTCH COMPANY, OF CLEVELAND, OHIO, A CORPORATION OF OHIO.

SELF-OILING BEARING.

Application filed April 4, 1923. Serial No. 629,752.

This invention relates to a self oiling bearing and more particularly to a bearing of this character in which a ring is adapted to lift the oil from a lower oil well and deliver the same to devices which distribute the same over the journals or bearing surfaces of the bearing.

In self oiling ring bearings of this type, as heretofore constructed, the oil lifting ring surrounds the shaft and rests with its upper part directly thereon adjacent to the side walls of the distributing chamber or cavity, which extends upwardly from the oil well. In this case, the oil ring is turned by the shaft and the driving force consisting of friction due to the weight of the ring on the shaft together with the adhesion produced by the oil in the wedge-shaped recess which is formed between the tangent circles of the periphery of the shaft and the bore of the oiling ring. This adherent pull of the oil may be entirely absent upon starting the turning motion of the shaft and until by rotation of the ring the oil is drawn up from the oil well to the crotch between the periphery of the shaft and the bore of the oil ring. Until the oil reaches this position the ring is dependent upon its rotation or turning movement by the friction contact between the ring and the shaft due to the weight of the ring, which friction is exerted only on a straight line. As this friction is very small, due to the comparatively small contact area between the oiling ring and the periphery of the shaft, the operation of these oiling rings is not reliable, inasmuch as they do not always start to turn. In addition to this, there is also a distinct retarding force in the operation of an ordinary ring as heretofore used, inasmuch as these rings ordinarily touch the adjacent stationary surfaces of the bearing on opposite sides of the same, so that there is a direct frictional resistance which operates to practically cement the oiling ring to the adjacent fixed surfaces of the bearing, thereby offering a resistance which sometimes more than counter balances the impelling force and thus prevents the oiling ring from starting its rotation. It is therefore apparent that in an ordinary ring oiling bearing where the ring may run against a fixed surface, that both the friction of the metal contact and the capillary oil attraction would operate as a retarding force to either prevent or interfere with the free rotation of the oiling ring and thus render the oiling device of the bearing unreliable.

Another objection to the ordinary form of collar oiling bearing is that the same must be run at comparatively low speed, say not to exceed one thousand feet per minute. If an ordinary collar oiling bearing is run at a much higher speed than this, the pumping action of the oiling ring will cause the oil to be lifted and thrown out at the ends of the bearing and through the crack at the junction between the cap and base, so that in a comparatively short time the oil supply well or cellar of the bearing will be emptied and thus seriously interfere with the proper operation of the bearing under these conditions.

It is the object of this invention to provide a bearing of this general type which will permit the bearing or journaled surfaces of the bearing to run at much higher speeds, say a peripheral speed as high as forty-five hundred feet per minute and still properly lubricate the same and to accomplish this by means which are simple in construction, efficient in operation, and will not require any change in the construction of the other parts of the bearing in which the shaft is journaled.

Figure 2:
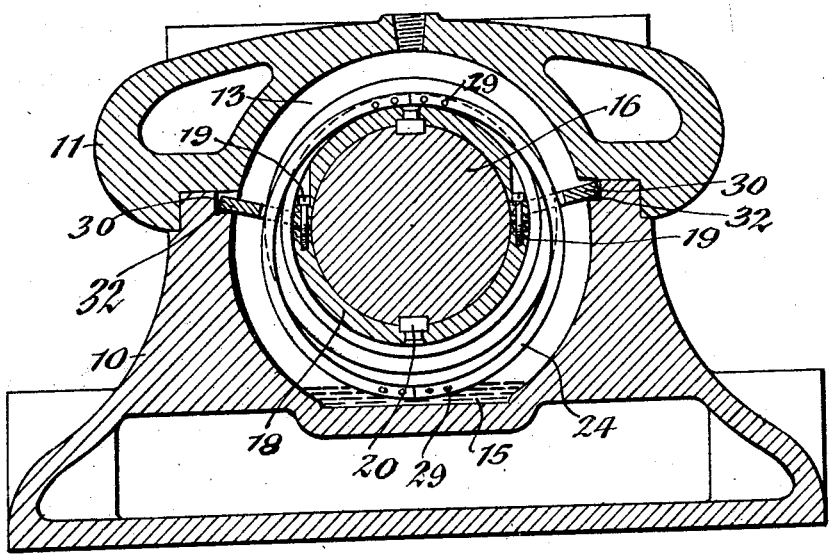

In the accompanying drawings: Figure 1 is a vertical longitudinal section of a self oiling bearing embodying our invention, this section being taken on line 1—1, Fig. 3. Figure 2 is a vertical cross section taken on line 2—2, Fig. 1. Figure 3 is a top plan view of the bearing with the cap removed. Figure 4 is a side elevation of one form of thrust collar suitable for use in connection with our invention. Figure 5 is a similar view of a form of oiling ring suitable for use as part of our invention. Figures 6 and 7 are cross sections of the thrust collar and oiling ring, taken on lines 6—6, and 7—7, respectively. Figure 8 is a top plan view of one of the oil wipers. Figure 9 is a side elevation of one of the same. Figures 10 and 11 represent modifications of our invention.

Similar characters of reference refer to like parts throughout the several views.

The bearing proper which is adapted to be used in connection with our invention may be variously constructed, but that shown in the drawings is suitable and preferred and comprises a base or bottom section 10 and a cap 11 detachably secured on the base, the inner opposing surfaces of the cap and base being constructed to form two bearing sections 12, 12 which are spaced apart at their opposing ends to form a distributing chamber or cavity 13 between the same while the outer ends of these bearing sections are spaced apart from the ends of the cap and base, so as to form return cavities 14, and the base section being provided with a longitudinal oil supply well or cellar 15 which communicates with the lower end of the distributing chamber 13 and the return chambers 14.

The shaft 16 which is rotatably supported by this bearing is journaled in the bearing sections 12, 12 and extends through the opposite ends of the body or base and the cap of the bearing.

Our improved oiling device which is associated with these parts operates to lift the oil from the central part of the well outwardly through the distributing cavity where the same is delivered to the bearing sections and then flows over the operating surfaces of these bearings and the shaft to the return chambers or passages 14 and thence back into the well preparatory to being used over again. In the preferred construction of our oiling device, as shown in the drawings, the same is organized as follows:

18 represents a thrust collar which is secured to the periphery of the shaft within the distributing chamber or cavity and which is of such a diameter that its lower part does not touch the surface of the supply of oil contained within the oil well or cellar. This thrust collar may be constructed and applied to the shaft in any suitable manner, for instance, as shown in Figs. 2 and 4, this thrust collar may be split diametrically so as to permit of conveniently applying the same to or detaching the same from the shaft, which split parts are detachably connected with each other at their opposing ends by means of screws 19 and this collar may be secured to the shaft, so as to turn therewith by any suitable means, for instance keys 20 secured to the peripheral surface of each of the thrust collar sections and engaging with keyways 21 on the adjacent part of the periphery of the shaft, as shown in Figs. 1, 2 and 4.

On its periphery the thrust collar is provided with an annular groove or channel, the bottom 22 of which is preferably horizontal and the side walls 23 thereof vertical, as best shown in Figs. 1 and 6.

24 represents an oiling ring, which may also be varied but which preferably has a horizontal bore 25 and two vertical side edges 26, as best shown in Figs. 1 and 7. This oiling ring surrounds the thrust collar and is arranged with its upper part in the upper part of the groove in the thrust collar and rests with the upper part of its bore against the upper part of the bottom of the groove in the thrust collar. The lower part of this oiling ring dips into the oil within the well immediately below the distributing cavity or chamber. As a whole this oiling ring is of a larger size than the thrust collar, the bore of the oiling ring being of larger diameter than the periphery of the thrust collar, so that the circles of the bottom of the groove in the thrust collar and the bore of the oiling ring are tangent relatively to each other. This oiling ring is preferably split diametrically so that the same may be easily applied to and removed from the thrust collar without taking the shaft out of the bearing and a connection being established between the ends of this oiling ring on opposite sides of each split therebetween, by means of a coupling piece 27 arranged in rabbets 28 on the opposite ends of the oiling ring and secured thereto by means of rivets 29, as shown in Figs. 2, 3 and 5.

On horizontally opposite sides of the shaft are arranged two wipers or oil directors or distributors which operate to remove the oil from the upper parts of the thrust collar and direct the same toward the co-operating bearing surfaces between the bearing sections and the shaft for the purpose of lubricating these surfaces. In their preferred form, each of these wipers 30 is constructed of substantially U-shaped form and is loosely confined with its cross piece 31 within a recess 32 between the adjacent parts of the base and cap of the bearing, while the legs 33 of the same are stepped, so as to permit the same to straddle the adjacent part of the oiling ring and thrust collar and also forming longitudinal scraping edges 34 on these legs which engage with the periphery of the thrust collar on opposite sides of its groove, and also transverse scraping edges 35 which engage with the opposite outer vertical edges of these thrust collars. The oiling ring does not engage with either of the wipers or any other relatively stationary part of the bearing but only engages with the thrust collar.

In the operation of this oiling device the thrust collar while turning with the shaft causes the oiling ring to also turn in the same direction. While these parts are thus turning the lower part of the thrust collar does not dip into the oil supply within the well and therefore does not pick up any oil at this point and throw the same out by centrifugal force against the walls of the bearing base and cap when running at very high speeds, thereby preventing the oil supply from being pumped out of the well and forced out through the ends of the bearing and the joints between the base and cap and rapidly exhausted and wasted, as would otherwise be the case. Instead of this, the oiling ring which dips with its lower part into the oil in the well lifts this oil to the upper part of the thrust collar at a comparatively slow rate of speed and then one or the other wiper removes the film of oil from the periphery of the thrust collar and the opposite sides of the same by the longitudinal and transverse scraping edges of the wiper, whereby the oil is directed from the thrust collar toward the journaling or bearing surfaces between the shaft and bearing sections on opposite sides of the thrust collar. The oil then flows along these bearing surfaces to the opposite outer ends and the excess passes downwardly through the return chambers or passages into the well ready to be recirculated. The initial part of the turning movement of the oiling ring is effected by the weight of the same resting by frictional contact with the upper part of its bore against the bottom of the groove in the thrust collar and also by the ring impinging sidewise against the sides of said groove. As soon however as the oil ring has lifted the oil to the upper part of the thrust collar this oil produces an adhesion or capillary attraction between the bottom of the groove and the bore of the ring and between the sides of this groove and the sides of this ring which further aids as a force for impelling the oiling ring. Owing to the bottom of the groove in this thrust collar being of larger diameter than the periphery of the shaft, a larger area of contact exists between the bore of the oiling ring and the thrust collar than would be the case if the ring rested on the periphery of the shaft, whereby a more effective propelling effect is produced on the oiling ring and a lifting effect of the latter on the oil is insured.

Furthermore, by engaging the oiling ring only with the thrust collar the same is supported by a part moving in the same direction and the oiling ring is thus held out of engagement from any adjacent stationary parts or surfaces of the bearing. If the oiling ring were permitted to engage frictionally with such stationary surfaces, its rotation would be retarded and interfere with obtaining the maximum oil lifting effect. Such contact of the ring with a stationary surface is particularly objectionable when starting the rotation of the shaft after the same has been at rest for a time, inasmuch as experience has shown that under these circumstances, the oiling ring often is cemented to a stationary surface of the bearing by the adhesive effect of the oil, thus preventing the ring from turning and lifting the oil and rendering the lubrication of the bearing wholly inoperative so that the bearing is injured or destroyed in a comparatively short time.

It will therefore be apparent that the construction of this improved oiling device insures starting the operation of lubricating the bearing the instant the shaft begins to turn and that the oil will not be thrown violently out through the joints and ends of the bearing during high speeds of the shaft but will be lifted at a comparatively slow rate and deposited onto the thrust collar and subsequently delivered to the bearing surfaces. The present thrust collar is smaller in diameter than those heretofore used so that the same can not touch the oil and throw it out by centrifugal force, particularly at high speeds.

The reduction in the diameter of the thrust collar and the making of the oil ring narrower than the thrust collar accounts for the reduced centrifugal effect on the oil, inasmuch as this ring presents a smaller surface to the oil than the thrust collars heretofore used, and travels at a slower speed, thus avoiding the tendency to throw the oil against the sides of the bearing.

Moreover, this oiling device is very simple in construction, not liable to get out of order and can be readily applied to the shaft and the bearing in which the same is journaled.

Instead of arranging the oiling device at the center of the bearing the thrust collar 18$^a$ and oiling ring 24$^a$ may be arranged at one end of the bearing, as shown in Fig. 10, or thrust collars 18$^b$ and oiling rings 24$^b$ may be arranged at both ends of the bearing, as shown in Fig. 11, the operation of the oiling device in each instance being identical with that described with reference to the construction shown in Figs. 1–9.

In this bearing the collar has a definite function at all speeds, serving as the rotating member which carries the oil transferred to it by the ring, to a place where the oil is mechanically removed from it by a wedge shaped wiper. The thrust action of the collar is incidental inasmuch as the bearing ring works with a sliding action on a feather key.

No dependence is placed in this oiling system on gravity, the kinetic energy of the moving oil on the collar being transformed into a static pressure head which causes the oil to flow along the shaft at the longitudinal openings provided between the cap and base.

The present device therefore differs advantageously from similar devices heretofore known, inasmuch as these prior devices were usually fed by gravity at low shaft speeds, whereby a small volume of oil would reach the bearing surfaces, and at high speeds the centrifugal force of the oil thrown from the collar would cause foam which destroys the lubricating quality of the oil. Moreover, it occupies a greater volume than fluid oil, thereby emptying the lubricating oil out of the bearing very rapidly.

In the present construction of bearings, the oil at any speed is elevated to the collar by the ring, which latter travels in a groove in the collar having straight sides, the oil coming to the surface of the collar adheres and is carried through part of a revolution to a scraper or wiper which actually touches the collar, positively removing the oil from it and distributing it positively along channels between the cap and base. The oil thrown from the collar by centrifugal force will return to the sump or well in the lower part of the bearing due to gravity or flows down in between the collar and the thrust surface. The oil which adheres to the collar is bubble-free and is positively scraped off from the same by the wipers or scrapers which latter direct the oil along the shaft under pressure head and along longitudinal passes in the plane of the parting between the cap and base.

The vital feature of superiority in the present structure may be summed up in the following points:

a. No oil is taken from the ring by any scraping action. It is simply transferred by the ring to the collar as it would be to a rotating shaft, and then the scrapers remove the oil from the collar and direct the same to the oil ducts leading to the bearing surfaces.

b. No dependence is placed upon an amount of oil coming from the ring onto the collar which would be sufficient in volume to overflow the collar groove and flow into any kind of channel. It has been found by experience that at slow and medium speeds a ring does not bring up sufficient oil for this purpose—hence the superiority of collar oiling bearings over ring oiling bearings generally. Nor is dependence placed upon oil thrown across a gap from a rotating member at high speed to a stationary baffle. Actual experience has demonstrated that throwing oil across a gap causes entrainment of air in the oil in the form of bubbles, thereby producing foaming which as previously explained, enters the bearing through the ends where the same has passages for the shaft.

c. The collar has a groove with perfectly straight sides so that the ring may run free, and be guided sidewise by these straight sides. If otherwise constructed, as actual experience has definitely shown, the ring will jump or climb and become displaced from the collar.

d. Only the clear fluid oil, free from air, which actually has been transferred by contact from the ring to the collar, is taken from the latter by the scrapers and directed to the ducts leading to the bearing surfaces.

e. Removal of the oil from the collar is accomplished by a scraper which rests against the collar surfaces and moves axially with the collar so that it may shift in the bearing. This scraper or wiper positively takes the oil from the collar and distributes it, not by gravity due to the inclined passages, but directly along the shaft in channels between the cap and base.

f. No dependence is placed in this construction either upon gravity or centrifugal force to remove the oil from the collar, or to distribute it. In fact, this construction uses the hydraulic principle of changing velocity head (kinetic energy) to pressure head (static pressure) to push the oil along the shaft, on both sides of it, and toward each end of the bearing in perfectly horizontal channels.

g. By this distribution of the oil, which is all important, the shaft is positively flooded with oil under actual pressure, foaming is avoided and with medium speeds there is assured an adequate flood of oil to the rotating surfaces on each side of the collar. Actual trials with this bearing clearly demonstrates its superiority, inasmuch as this bearing produces a positive oil distribution resulting in flooding of the shaft with oil in such quantity as to insure a fluid borne shaft resting upon and gripped within the bearing surfaces by a true oil film. This has been actually demonstrated on many occasions in tests which show that a perfect electrical insulation between the shaft and the supporting surfaces of the bearing are obtained in this bearing by the insulating flood film of oil between the same.

We claim as our invention:

1. A self oiling bearing comprising a body having a well in its lower part adapted to contain a supply of oil, a bearing above the level of the oil in said well in which a shaft is adapted to be journaled and both ends of which communicate with said well, a collar arranged on said shaft above the level of the oil in said well and provided with an annular groove, an endless lifting member surrounding said collar and resting with its upper part in the top of the groove of the same while its lower part dips into the oil in said well and said lifting member being rotated by contact with said collar and operating to raise the oil from the well to the top of said collar, and a scraper which is mounted on said body and engages the upper part of said collar and operates to remove the oil from said collar and direct it to the adjacent end of said bearing, said lifting member engaging only with said collar and supported out of engagement from adjacent stationary parts or surfaces.

2. A self oiling bearing comprising a body having a well in its lower part adapted to contain a supply of lubricating oil, two bearings arranged above the level of the oil in said well and adapted to have a shaft journaled therein, the inner ends of said bearings being spaced apart and communicating with the central part of said well, and the outer ends of said bearings communicating with the outer ends of said well, a collar arranged on said shaft between the opposing inner ends of said bearings and above the level of the oil in said well and provided with an annular groove, an endless lifting member surrounding said collar and resting with its upper part in the top of the groove of the same while its lower part dips into the oil in said well and said lifting member being rotated by contact with said collar and operating to raise the oil from the well to the top of said collar, and a scraper which is mounted on said body and engages with the upper part of said collar and operates to remove the oil from said collar and direct it to the adjacent inner ends of said bearings, said lifting member engaging only with said collar and supported out of engagement from adjacent stationary parts or surfaces.

3. A self oiling bearing comprising a body having a well in its lower part adapted to contain a supply of lubricating oil, two bearings arranged above the level of the oil in said well and adapted to have a shaft journaled therein, the inner ends of said bearings being spaced apart and communicating with the central part of said well, and the outer ends of said bearings communicating with the outer ends of said well, a collar arranged on said shaft between the opposing inner ends of said bearings and above the level of the oil in said well and provided with an annular groove, an oil lifting ring surrounding said collar and resting with its upper part in the top of the groove of the same while its lower part dips into the oil in said well and said ring being rotated by contact with said collar and operating to raise the oil from the well to the top of said collar, and a U-shaped scraper which has its legs straddling said ring and collar and has its cross bar mounted on said body and is provided on the inner side of its legs with shoulders which engage with the periphery of the collar on opposite sides of the groove therein, thereby operating to remove the oil from said collar and direct it to the adjacent ends of said bearings, said lifting ring engaging only with said collar and supported out of engagement from adjacent stationary parts or surfaces of the bearing.

HARRY J. SMITH.
BENJAMIN A. SMITH.